(12) United States Patent
Lien

(10) Patent No.: US 6,543,507 B2
(45) Date of Patent: Apr. 8, 2003

(54) PEEL-OFF ROLLER FOR LAMINATED LAYER

(75) Inventor: Brent D. Lien, Minneapolis, MN (US)

(73) Assignee: Fargo Electronics, Inc., Eden Prairie, MN (US)

( * ) Notice: Subject to any disclaimer, the term of this patent is extended or adjusted under 35 U.S.C. 154(b) by 0 days.

(21) Appl. No.: 09/771,028

(22) Filed: Jan. 26, 2001

(65) Prior Publication Data
US 2001/0025692 A1 Oct. 4, 2001

Related U.S. Application Data
(60) Provisional application No. 60/179,264, filed on Jan. 31, 2000.

(51) Int. Cl.[7] .............................................. B32B 35/00
(52) U.S. Cl. ........................ 156/384; 156/540; 156/584; 492/16
(58) Field of Search ............................... 156/556, 538, 156/540, 555, 541, 542, 584, 384; 492/16, 17, 18, 46, 47

(56) References Cited

U.S. PATENT DOCUMENTS

| | | | | |
|---|---|---|---|---|
| 2,877,586 A | * | 3/1959 | Chenery et al. | 156/358 |
| 4,287,285 A | | 9/1981 | Mosehauer | 430/124 |
| 5,238,524 A | * | 8/1993 | Seki et al. | 156/538 |
| 5,277,501 A | | 1/1994 | Tanaka et al. | 400/120 |
| 5,492,590 A | * | 2/1996 | Sakai | 156/249 |
| 5,807,461 A | | 9/1998 | Hagstrom | 156/361 |
| 5,810,962 A | * | 9/1998 | Annenkov et al. | 156/344 |

\* cited by examiner

Primary Examiner—Richard Crispino
Assistant Examiner—Sue A. Purvis
(74) Attorney, Agent, or Firm—Westman, Champlin & Kelly, P.A.

(57) ABSTRACT

An intermediate transfer film on which an image is printed is carried on a backing web and after is laminated to a substrate, such as an identification card. A lamination station uses heater rollers for the lamination process, and subsequent to the lamination station the backing web is guided to a take-up roller around a peel-off roller. The peel-off roller is supported in a heat insulating frame to minimize storing heat that increases the likelihood of flakes of the laminate material remaining with the backing web.

1 Claim, 1 Drawing Sheet

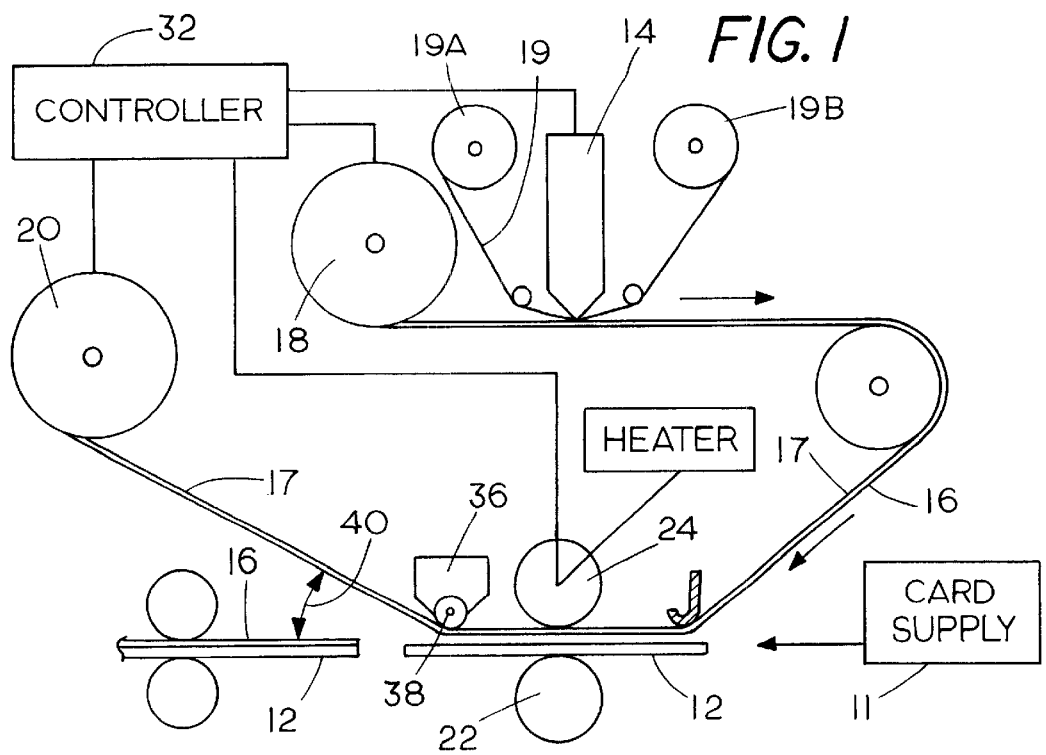
FIG. 1
FIG. 2 PRIOR ART
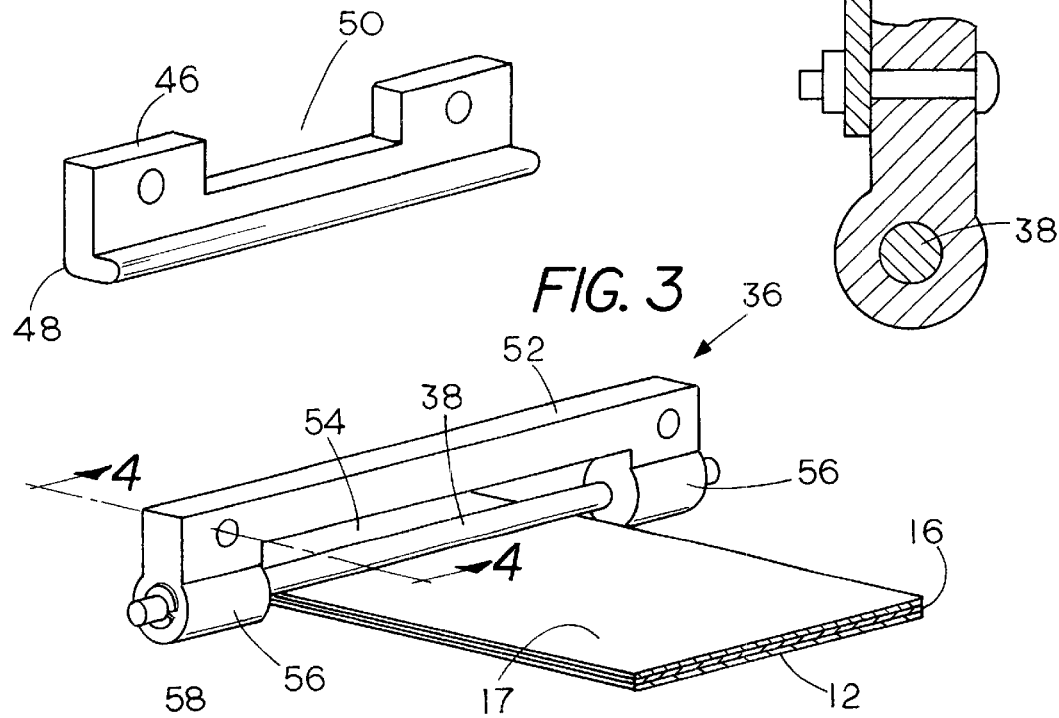
FIG. 3
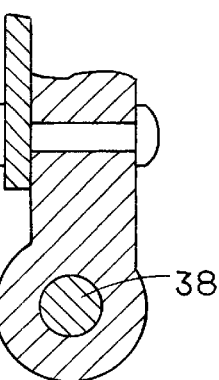
FIG. 4

PEEL-OFF ROLLER FOR LAMINATED LAYER

This application claims priority on provisional application Serial No. 60/179,264, filed Jan. 31, 2000 for PEEL-OFF ROLLER FOR LAMINATED LAYER.

BACKGROUND OF THE INVENTION

The present invention relates to a roller added to a reverse image printer that will provide reliable separation and removal of a printed laminated layer of material from a backing web or film after the printed layer has been laminated onto an identification card in particular.

U.S. Pat. No. 5,277,501 illustrates a method of transferring hot melt ink to a recording medium. The present invention provides a positive removal of the printed layer, called a printed transfer layer, from the backing film after the printed transfer layer has been laminated onto a substrate, specifically an identification card. In the prior art, the problems of having "flash" or flakes of the printed transfer layer separate from the web and the cards are present. In other words, there would not be a smooth and positive peel-off of all of the printed transfer layer that should be transferred from the web or film to the card. Flakes tend to come loose from the card in use, particularly along the edges and sides.

In the prior art, metal guide frames have been used with rounded noses for guiding the web or film after lamination of the printed transfer layer to the card to aid in separating the printed transfer layer from the backing web. The lamination process uses hot rollers that melt the ink at the interface of the transfer layer with the card to cause the transfer layer to adhere to the card surface. It has been recognized that residual heat stored in the guides for the web after lamination is not desirable. The conventional peel-off bars have had material removed from them in order to reduce heat storage. However, the problems with flakes or flash that separate from the printed lamination material forming the transfer layer remain.

SUMMARY OF THE INVENTION

The present invention relates to a reverse image printer, wherein a film or web carries a printable transfer layer that is printed with a reverse image and then laminated to a substrate, such as an identification card. The transfer layer may be a transparent layer of material on which images are printed using a printhead and separate ribbon, or the layer can be an ink layer on a transparent film or sheet on which images are created.

Apparatus for insuring reliable removal of the transfer or laminate layer from the web or film that carries the transfer or laminate layer after the layer has been through the lamination station is provided.

In an intermediate transfer printing process, a backing film or web carrying a transparent transfer layer is passed through a printer where a reverse image is printed. The transfer layer is then laminated to an aligned and indexed substrate, such as an identification card. The printed transfer layer comprising the laminate that is to applied to a substrate or card is pressed against the card and is heated with lamination rollers to cause the printed transfer layer to adhere to the surface of the card. The transfer layer or laminate has to then be separated from the backing film or web that carries it, while the transfer layer remains as a smooth, uninterrupted layer on the card. The backing web, the transfer layer and the card are moved in unison from the heated lamination rollers and across a separation or peel-off roller where the backing web or film is being separated from the transfer film by directing the backing web toward a web take-up roller at a separation angle relative to the plane of the card and the transfer film, now laminated to the card. The peel-off roller has a relatively small radius, and is positioned so that as the backing web material moves toward the take-up roll for the web material, and the card continues on its path or plane of movement, the angle formed between the plane of the path of movement of the laminated card and the plane of the backing web material as it moves toward the take-up roll is selected to guide the web away from the transfer layer and card without an abrupt change of direction. The tendency of the backing web and transfer layer, to stick together is reduced and the transfer layer stays laminated to the card. The problems with flaking, where flakes of the transfer layer break off or delaminate from the card, particularly along the transfer layer and card edges are reduced.

It is desirable to cool the transfer layer after lamination to insure it sticks to the card. Thus adding heat stored in the peel-off roller is undesirable. The present peel-off roller is mounted on a heat insulating mounting, and it does not have a large mass acting as a heat sink. Further, the mounting is made so cooling air can circulate over the peel-off roller and the backing web.

BRIEF DESCRIPTION OF THE DRAWINGS

FIG. 1 is a schematic representation of a printing and lamination station for an intermediate transfer film printer utilizing a peel-off roller made according to the present invention;

FIG. 2 is a schematic perspective view of a prior art peel-off bar;

FIG. 3 is a perspective view of a peel-off roller made according to the present invention, showing a backing web, card and transfer or laminate layer moving past the peel-off roller; and FIG. 4 is a sectional view taken as on line 4—4 in FIG. 3.

DETAILED DESCRIPTION OF THE ILLUSTRATIVE EMBODIMENTS

FIG. 1 shows a printing system 10 made according to the present invention. The process is a reverse image printing process described in U.S. Pat. No. 6,261,012B1 issued Jul. 17, 2001 and entitled PRINTER HAVING AN INTERMEDIATE TRANSFER FILM, which is incorporated by reference. A card 12 is to have a printed image laminated thereon, and is provided from a card supply 11. A print station 14 prints a reverse image on a heat transferable layer that will be laminated to a card 12. The printing can be directly on a laminate or transfer layer 16, or a ribbon 19, such as a thermal resin or a thermal dye sublimation ribbon, can be passed under the print station 14 and used to print on laminate layer 16 which is carried on a film or web 17.

The ribbon 19 extends between a supply roller 19A and a take-up roller 19B and is controlled in a known manner. The backing film or web 17 and the intermediate laminate material layer or intermediate transfer layer 16 are held together with a releasable agent and moved from a supply roller 18 to a take-up roller 20. After printing the intermediate transfer layer 16, the web 17, and a card 12 are moved in unison between lamination rollers 22 and 24. The roller 24 has a heater 25 therein, which is shown schematically. The roller is capable of being moved downward to press the intermediate transfer layer 16 comprising a laminate material against the card 12. The roller 24 will heat the backing web and the transfer layer, and cause the bond between the backing web and the intermediate transfer layer to release and adhesive on the side of the intermediate transfer or laminate layer facing the card 12 to be activated. This will cause the intermediate transfer layer or laminate layer 16 to adhere to the top surface of the card 12. The layer also remains with the backing web 17 at this stage. The controller 32 is operably coupled to the ribbon supply and take-up rollers 19A and 19B, to the web supply and take up rollers 18 and 20, as well as to the lamination rollers 22 and 24 and to the print station 14, so that the controller can control printing and lamination operations.

In order to separate the backing film or web 17 from the intermediate transfer layer or laminate 16 carried on the backing film or web 17, a peel-off roller assembly indicated generally at 36 is provided. This is shown schematically in FIG. 1, and it can be seen that it has a roller 38 that is positioned relative to the take-up roll 20 for the web or film 17 such that the included angle indicated at 40 between the plane of movement of the card 12 and the transfer or laminate layer 16, which has been laminated to the card, and the separation plane of the backing web 17, is selected to encourage separation of the transfer layer 16 from the web 17 without forming loose flakes or flash from the intermediate layer. Additionally, the peel-off roller assembly 36 is made in a manner that aids in keeping the laminated layer 16 cool as the backing web 17 is separated from the laminated layer 16, after lamination to the card.

FIG. 2 is an illustration of a prior art peel-off bar. It is a metal bar 46, that has a rounded surface corner forming an edge shown at 48 against which the backing web will slide as it is moved toward the web take-up roller. There is no roller in the prior art peel-off bar, but the web slides against the rounded corner 48 of the peel-off bar 46. A recess 50 is provided for reducing the mass of the metal peel-off bar 46, to reduce heat storage. This represents the prior art that is in use. While it was recognized that heat storage was a problem, particularly heat transferred to the peel-off bar and the peel-off bar support from the hot card, laminate, and web coming from the heated roller 24, the problem of flaking or causing chips of the laminate material to remain with the backing web during removal of the laminate material layer. 16 from the backing web remains.

FIG. 3 is a perspective view of the peel-off roller assembly 36 of the present invention. The peel off roller assembly 36, as shown, has the roller 38 rotatably mounted in an outer frame 52 that is made of a heat insulating material, such as a suitable plastic. The frame 52 has a recess 54 in its center portions, and has hubs 56 at opposite ends of the recess that rotatably mount the roller 38. The roller 38 extends across the recess 54 and through the hubs 32. Suitable retaining rings 58 are used at opposite ends of the roller 38 for retaining the roller in place.

The use of a plastic, material for the frame 52, which has low heat storage capabilities, and is relatively heat insulating, reduces the tendency for heat from the backing web 17, the transfer layer 16 and the card 12 that are heated by the lamination rollers and which are shown schematically in FIG. 3 to be retained or stored in the peel-off roller assembly 36. The backing film or web 17 will be kept cooler so that the tendency of the transfer layer 16 to remain with the backing film or web 17 rather than remaining tightly laminated to the card and then flake off will be reduced. The recess 54 forms a space that permits air to circulate over the roller 38, to help keep the roller cool.

Also, the roller 38, which is also shown in FIG. 4, has a small diameter so that there is a relatively sharp change of direction of the backing film or web. The angle 40 is selected to provide a peel away action, rather than causing a 90° change of direction, which is done with the existing peel-off bar 46.

The angle 40 can be in the range of between 30° and 45°, so that the lifting, or peel-off action between backing web 17 and laminate layer 16 is enhanced.

Again, a thermally insulating frame 52 having a recess 54 in which a rotatable peel-off roller 38 rides, and against which the backing web 17 is supported when it moves to the take-up roll, provides a reliable peel-off of the backing web from the laminate material or transfer layer 16.

The term laminate layer or transfer layer does not mean that the layer is necessarily coextensive with the backing web. Chips or segments of laminate material at spaced intervals along the backing web can be used. The laminate layer can be severed in lengths to fit the card after lamination as well.

Although the present invention has been described with reference to preferred embodiments, workers skilled in the art will recognize that changes may be made in form and detail without departing from the spirit and scope of the invention.

What is claimed is:

1. For use in a printing and laminating assembly having a printer that prints on a layer carried on a backing web, and having a laminating station to heat laminate the layer to a card moving in a plane, the backing web being transferred to a take up roller subsequent to moving through the lamination station, the improvement comprising a peel-off roller and support frame assembly between the lamination station and the take up roller, the support frame comprising a unitary frame of heat insulating plastic material and having a cross member and a pair of spaced apart hubs depending from the cross member, the cross member being supportable on the assembly, the peel-off roller being rotatably mounted on the hubs and extending therebetween, the cross member being spaced from the peel-off roller to form an air gap over the peel-off roller, the peel-off roller engaging the backing web on a side thereof opposite from the layer, the peel-off roller being rotatably mounted in a frame, the peel-off roller being positioned relative to the take up roller so the backing web forms an angle of between 30° and 45° relative to a plane of movement of the card through the lamination station as the web moves across the peel-off roller, and the support frame supporting only the peel-off roller.

* * * * *